July 17, 1934.   F. MAGIDSON   1,967,059
TAG AND FASTENER MAKING MACHINE
Filed Nov. 25, 1931   13 Sheets-Sheet 1

INVENTOR
Frank Magidson
By Green & McCallister
His Attorneys

July 17, 1934.　　　　F. MAGIDSON　　　　1,967,059
TAG AND FASTENER MAKING MACHINE
Filed Nov. 25, 1931　　　13 Sheets-Sheet 2

INVENTOR
Frank Magidson
By Green & McCallister
His Attorneys

July 17, 1934.    F. MAGIDSON    1,967,059
TAG AND FASTENER MAKING MACHINE
Filed Nov. 25, 1931    13 Sheets—Sheet 4

INVENTOR
Frank Magidson
By Green & McCallister
His Attorneys

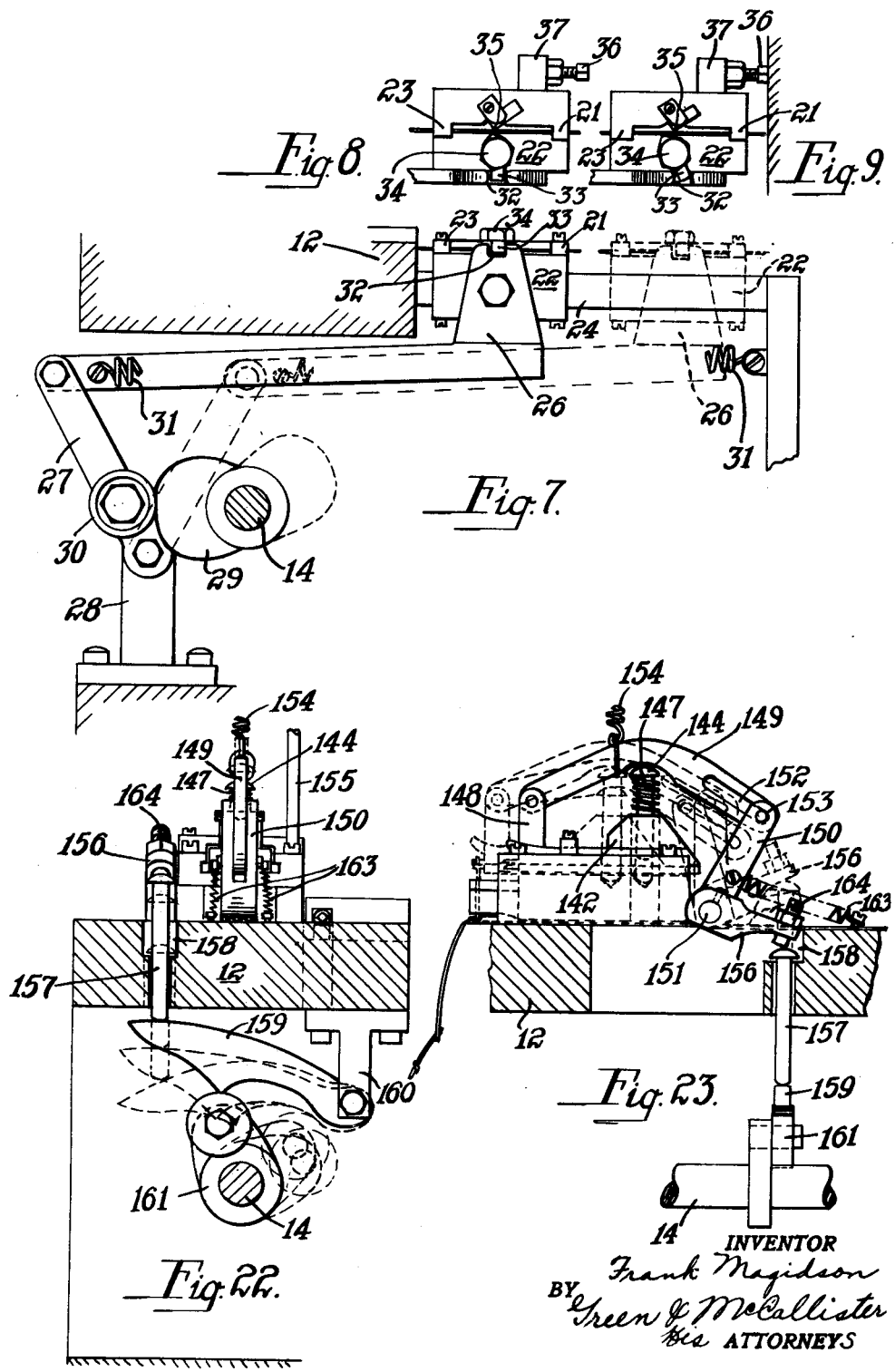

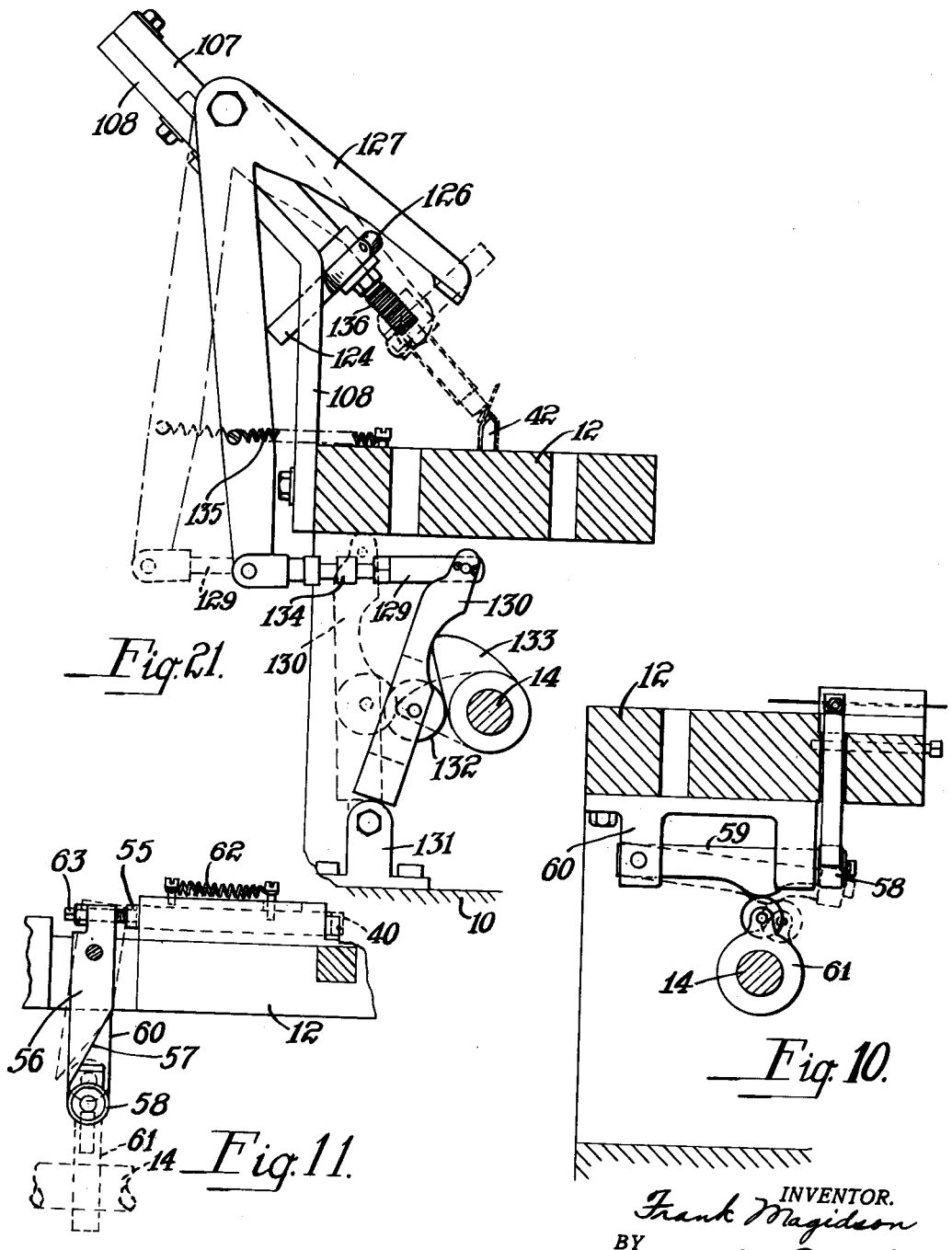

July 17, 1934.  F. MAGIDSON  1,967,059
TAG AND FASTENER MAKING MACHINE
Filed Nov. 25, 1931  13 Sheets-Sheet 8

INVENTOR
Frank Magidson
BY Green & McCallister
His ATTORNEYS

July 17, 1934.  F. MAGIDSON  1,967,059
TAG AND FASTENER MAKING MACHINE
Filed Nov. 25, 1931   13 Sheets-Sheet 9
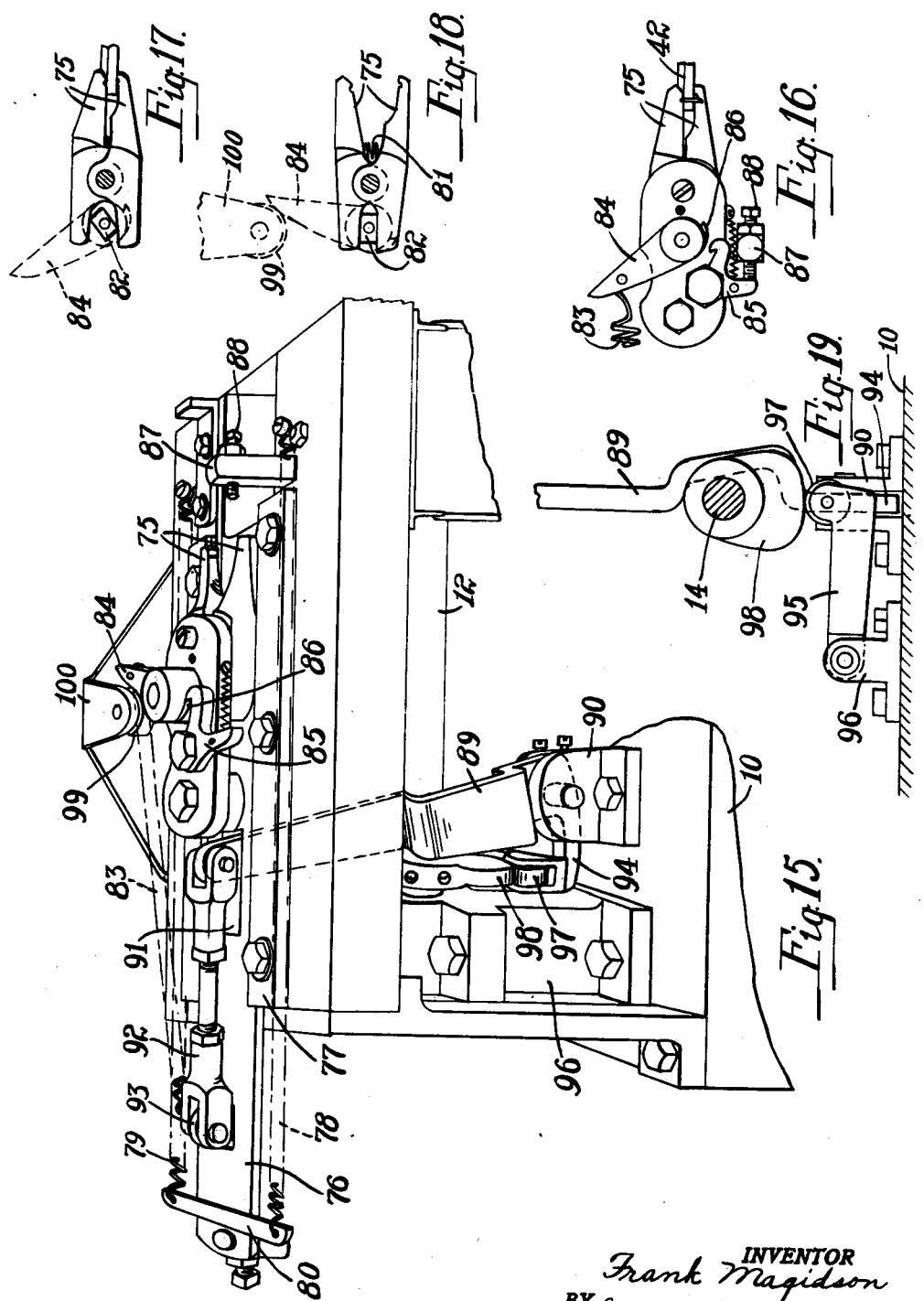
INVENTOR
Frank Magidson
BY Green & McCallister
His ATTORNEYS

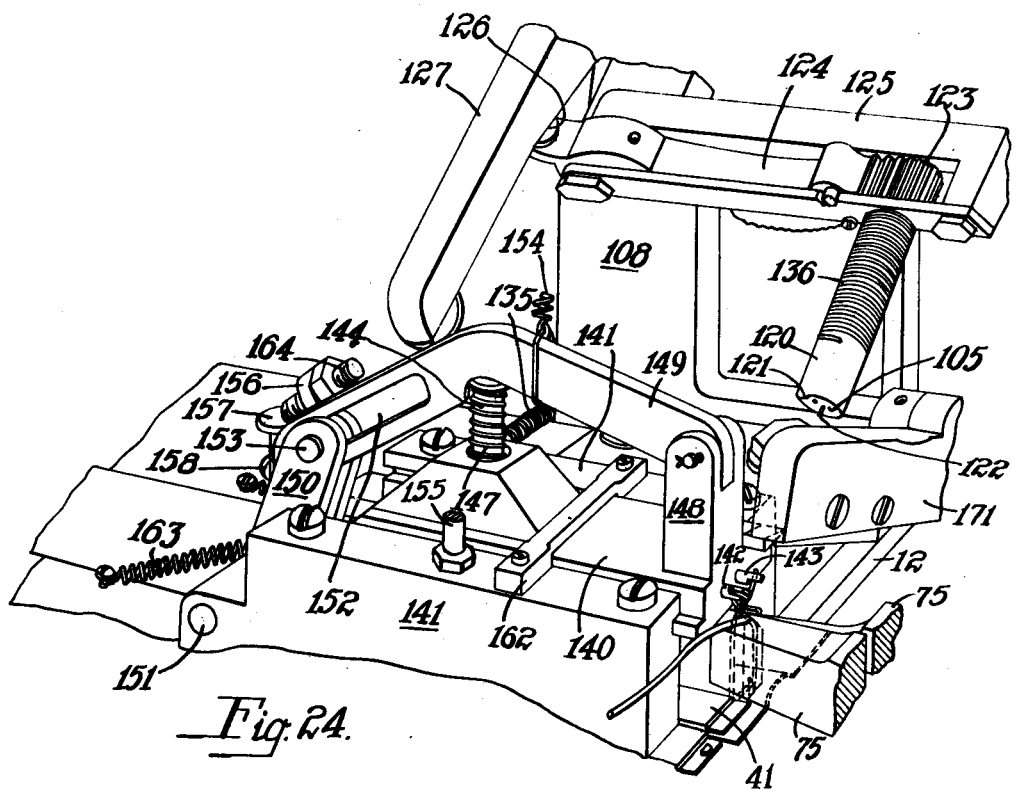

July 17, 1934.                F. MAGIDSON                1,967,059
                      TAG AND FASTENER MAKING MACHINE
                    Filed Nov. 25, 1931      13 Sheets-Sheet 12
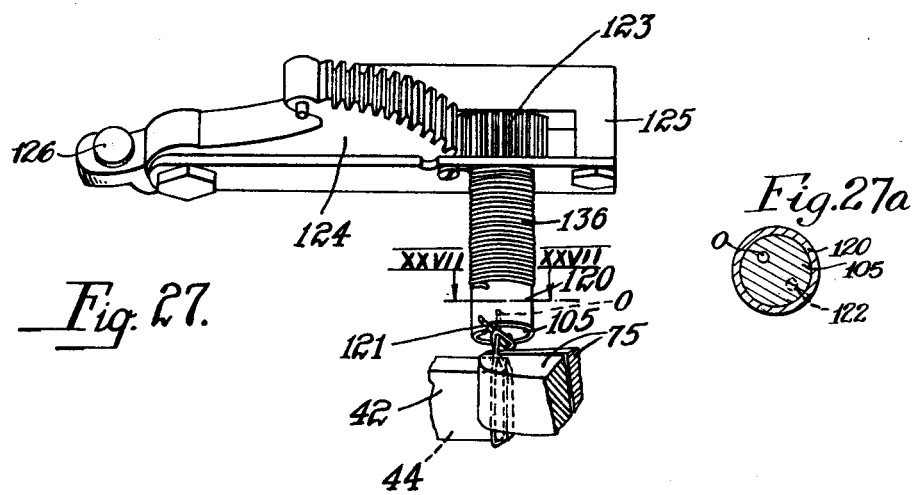
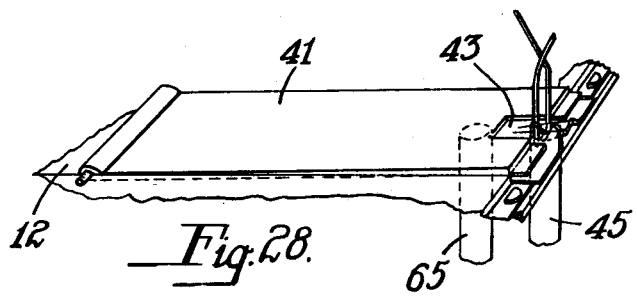
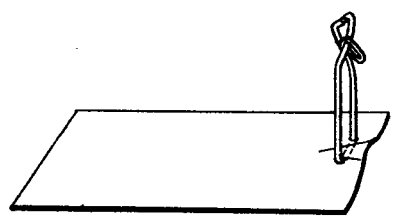
INVENTOR,
Frank Magidson
By Green & McCallister
His Attorneys

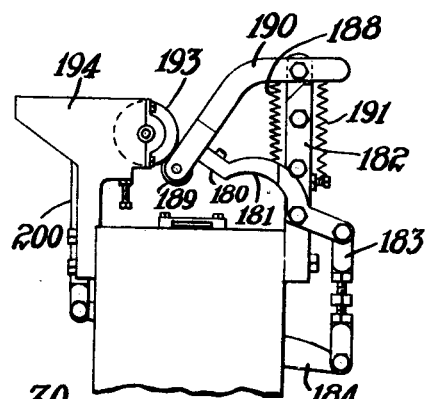
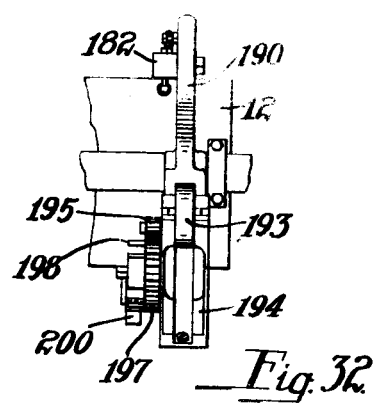
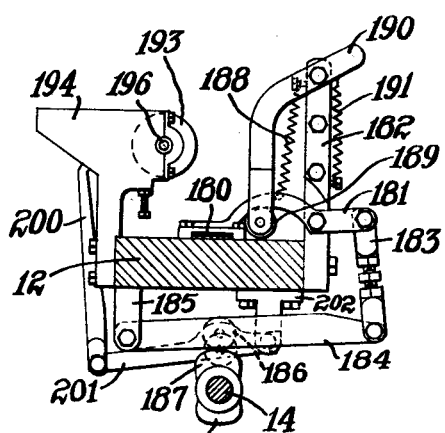
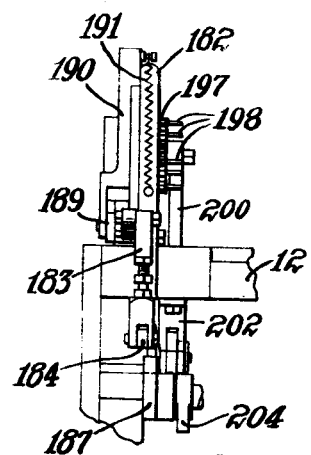
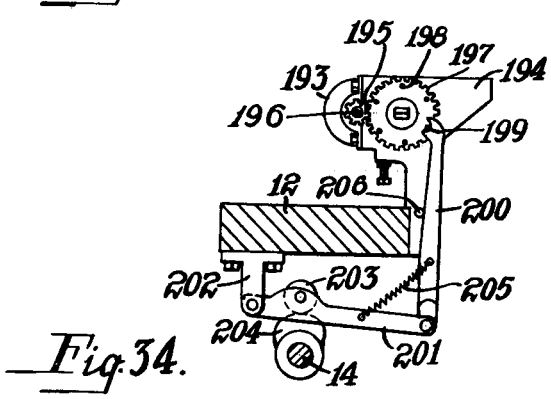

Patented July 17, 1934

1,967,059

UNITED STATES PATENT OFFICE 1,967,059

TAG AND FASTENER MAKING MACHINE

Frank Magidson, Pittsburgh, Pa., assignor to Pittsburgh Tag Company, a corporation of Pennsylvania Application November 25, 1931, Serial No. 577,189

19 Claims. (Cl. 93—91)

This invention relates to fasteners or clips (called pin tickets by the Patent Office) for marking tags, and more particularly, to a machine for automatically forming a fastener or clip, preferably such as disclosed in United States Letters Patent No. 1,769,885, issued to me on July 1, 1930, in place on the end of a strip of tag forming material and cutting the strip to secure the length of tag desired. In other words, this invention relates to an automatic machine for taking wire from a reel or other source, inserting the same through the end of a length of web withdrawn from a roll of tag forming material, severing the wire into certain lengths, bending the same into the form, preferably that shown in said patent, and cutting the material to the length of tag desired after the clip has been formed thereon.

In my pending application, Serial No. 568,191, filed October 10, 1931, I described a machine for forming wire fasteners of the type disclosed in my Patent No. 1,769,885 directly on marking tags of the type formed from cloth or paper having an eye in the end thereof through which a wire or the like is adapted to be inserted for fastening the tag in place. In that machine the tags of this type to be equipped with fasteners are placed into a hopper and fed one at a time into the machine. When a tag has been positioned in the machine a length of wire is threaded through the eye of the tag and after the desired length has been inserted through the tag it is severed and bent into the form of fastener disclosed in said patent.

While the parts of the machine in the present application perform the same functions in forming the fasteners as do the parts of the machine in my pending application, the instrumentalities for carrying out these functions in the present machine are for the most part unlike those in the former machine since the present machine is adapted to form the tag as well as the fastener.

An object of this invention is the production of a machine which will feed tag forming material from a roll, insert a length of wire through the material, cut the wire to the desired length, bend the wire into the desired shape and cut the tag forming material to the length of tag required after the clip or fastener has been formed thereon.

Another object is the production of a machine which will crimp the end of a roll of tag forming material, insert a length of wire drawn from a coil or other source through the crimped end of the material, cut the wire into definite length, bend the same into the form of fastener or clip, preferably as shown in my patent, and cut the material to the length of tag required.

Another object is the production of a fastener or clip making machine having mechanism for stamping a marking indicia at spaced intervals on tag forming material as it is fed into the machine.

A further object is the production of a wire fastener or clip making machine having mechanism for withdrawing the formed clip from the machine and at the same time feeding tag forming material from a roll or other source to the machine.

These and other objects which will readily appear to those skilled in this particular art I attain by means of the device described in the specification and illustrated in the drawings accompanying the same, wherein:

Fig. 7 is an enlarged detail view in elevation of the wire pulling mechanism;

Fig. 8 is a top plan view of the wire puller showing the position of the parts when pulling wire from a coil and feeding it into the machine;

Fig. 9 is a top plan view of the wire puller showing the position of the parts after the wire has been fed into the machine and the puller returned to its original position;

Fig. 10 is an enlarged detail view in elevation showing the mechanism for operating the wire cutter;

Fig. 11 is an enlarged detail view in elevation of the back of the wire cutting mechanism;

Fig. 15 is an enlarged view in perspective of the wire holding pliers and the mechanism for moving the pliers into and out of wire holding position, the pliers and mechanism being shown in their retracted position;

Fig. 16 is an enlarged plan view of the wire clamping pliers when in wire holding position and showing the mechanism for opening and closing the pliers;

Fig. 17 is an enlarged plan view of the wire holding pliers showing the mechanism for closing the pliers around the wire on the forming mandrel;

Fig. 18 is an enlarged plan view of the wire holding pliers in their open position;

Fig. 19 is an enlarged detail view in elevation of the mechanism for moving the wire holding pliers into and out of their wire holding position;

Fig. 21 is an enlarged detail view in elevation of the wire looping mechanism, parts of the mechanism when in wire looping position being shown in dotted lines;

Fig. 22 is an enlarged detail view in elevation of the back of the jaw-shaping mechanism;

Fig. 23 is an enlarged detail view in elevation of the side of the jaw-shaping mechanism;

Fig. 24 is a view in perspective of the jaw-shaping mechanism in its wire engaging position;

Fig. 25 is a top plan view of the jaw-shaping arms; a portion thereof being removed for convenience of illustration;

Fig. 26 is a view in elevation of the mechanism for turning the jaw-shaping arms;

Fig. 27 is an enlarged view in perspective of the mechanism for operating the wire looping cylinder;

Fig. 27a is a section taken on line XXVII—XXVII of Fig. 27;

Fig. 28 is an enlarged view in perspective showing the mechanism for crimping the tag forming material and the mechanism for bending the wire into U-shape; the forming mandrel being removed for convenience of illustration;

Fig. 29 is a view in perspective of the complete tag and fastener;

Fig. 30 is an enlarged detail view in elevation of the mechanism for stamping marking indicia on the tag forming material as it passes into the machine;

Fig. 31 is an enlarged detail view in elevation showing the indicia marking mechanism in its stamping position;

Fig. 32 is a top plan view of the indicia marking mechanism;

Fig. 33 is an enlarged partial view in elevation of the back of the indicia marking mechanism, and;

Fig. 34 is an enlarged view in elevation of the side of the indicia marking mechanism showing the mechanism for turning the ink conveyor roller.

The machine in general

Figure 1:
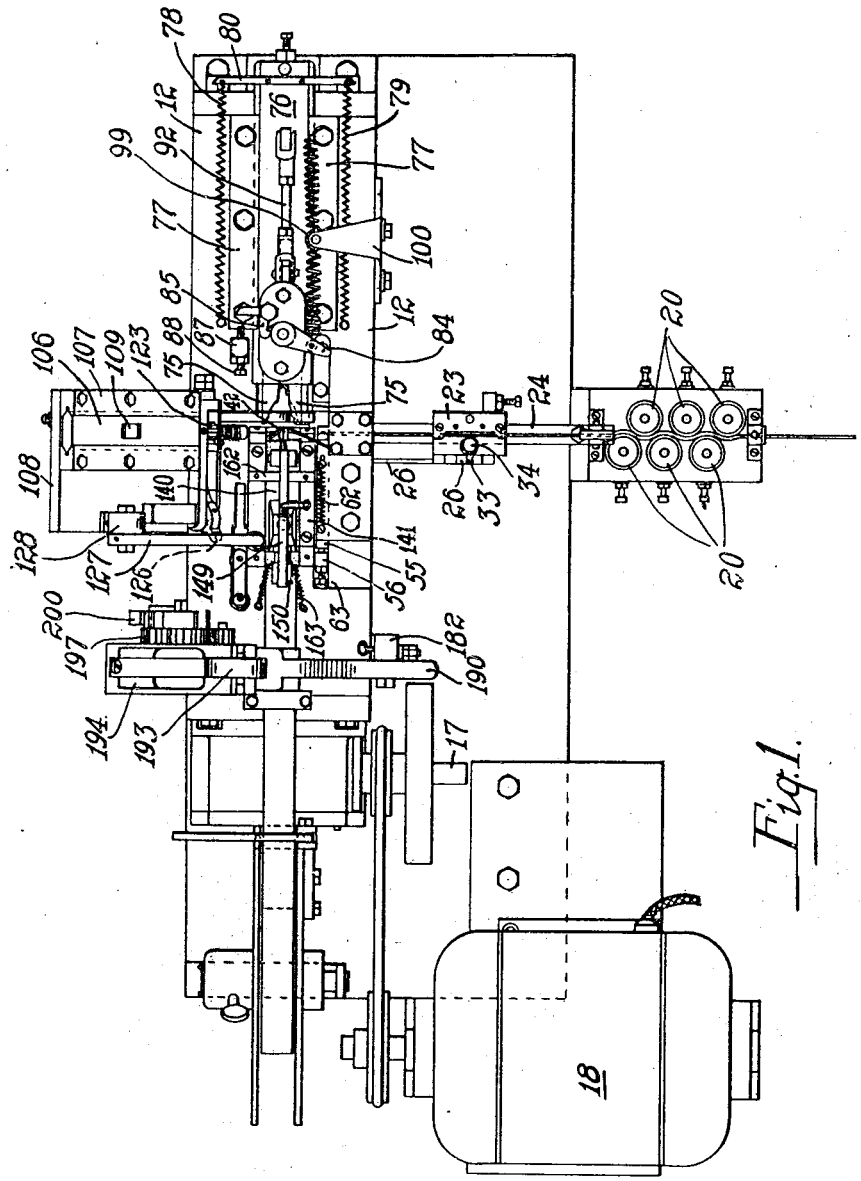
Figure 1 is a top plan view of the machine.
Figure 2:
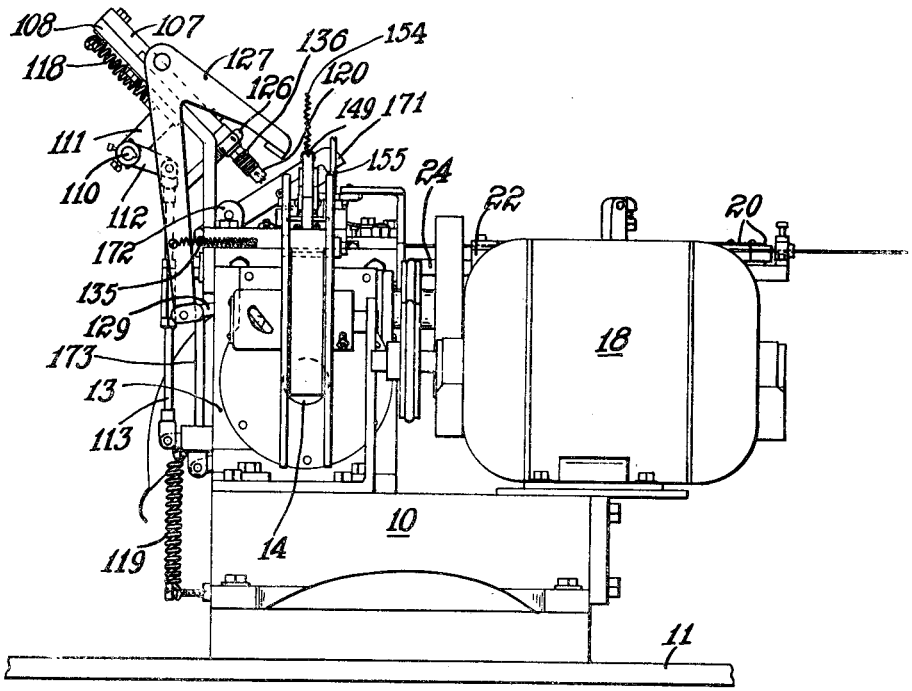
Fig. 2 is a view in side elevation looking toward the left side of the machine.
Figure 3:
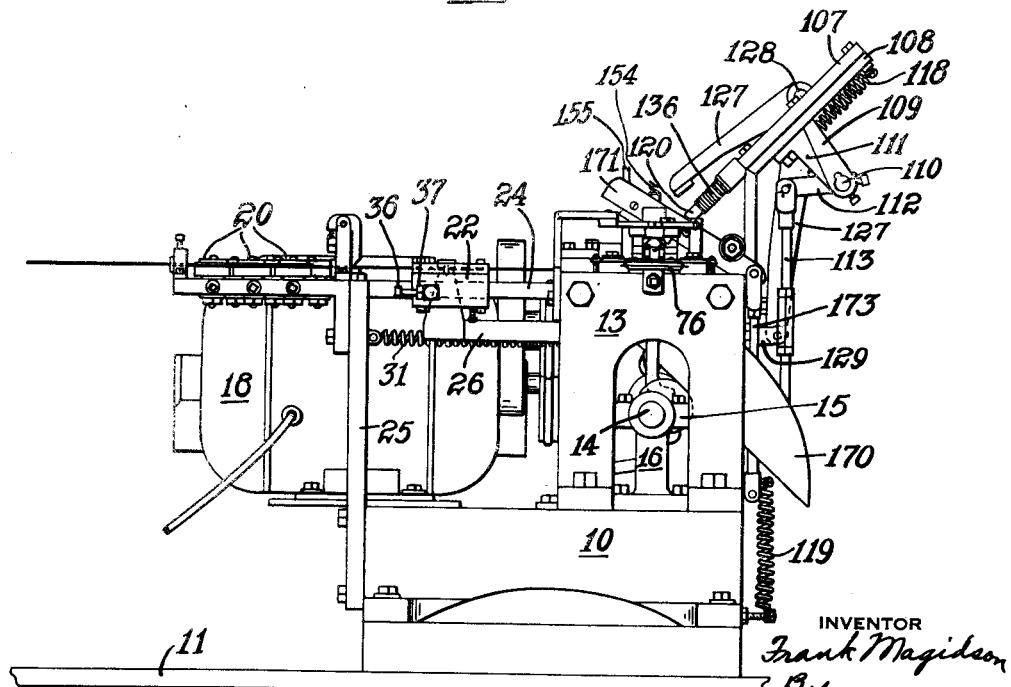
Fig. 3 is a view in side elevation looking toward the right side of the machine.
Figure 4:
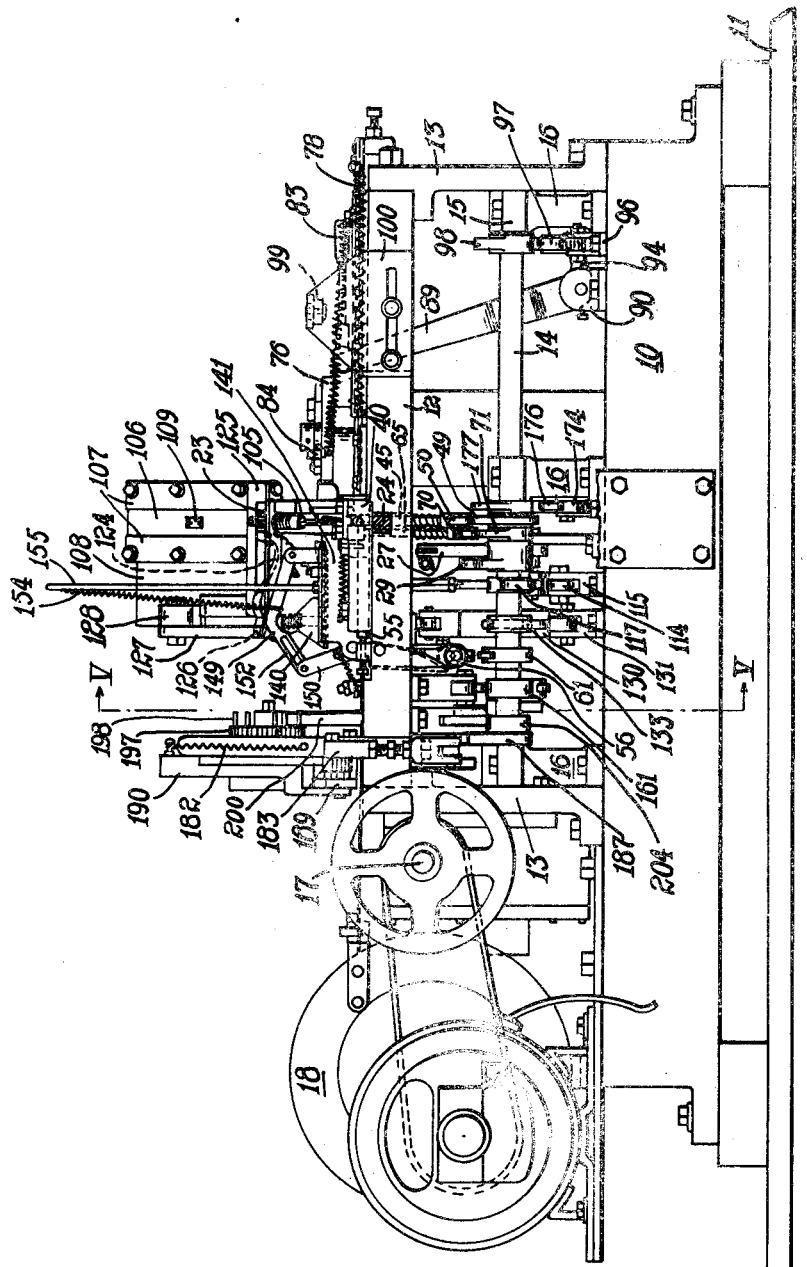
Fig. 4 is a view in elevation of the back of the machine.
Figure 5:
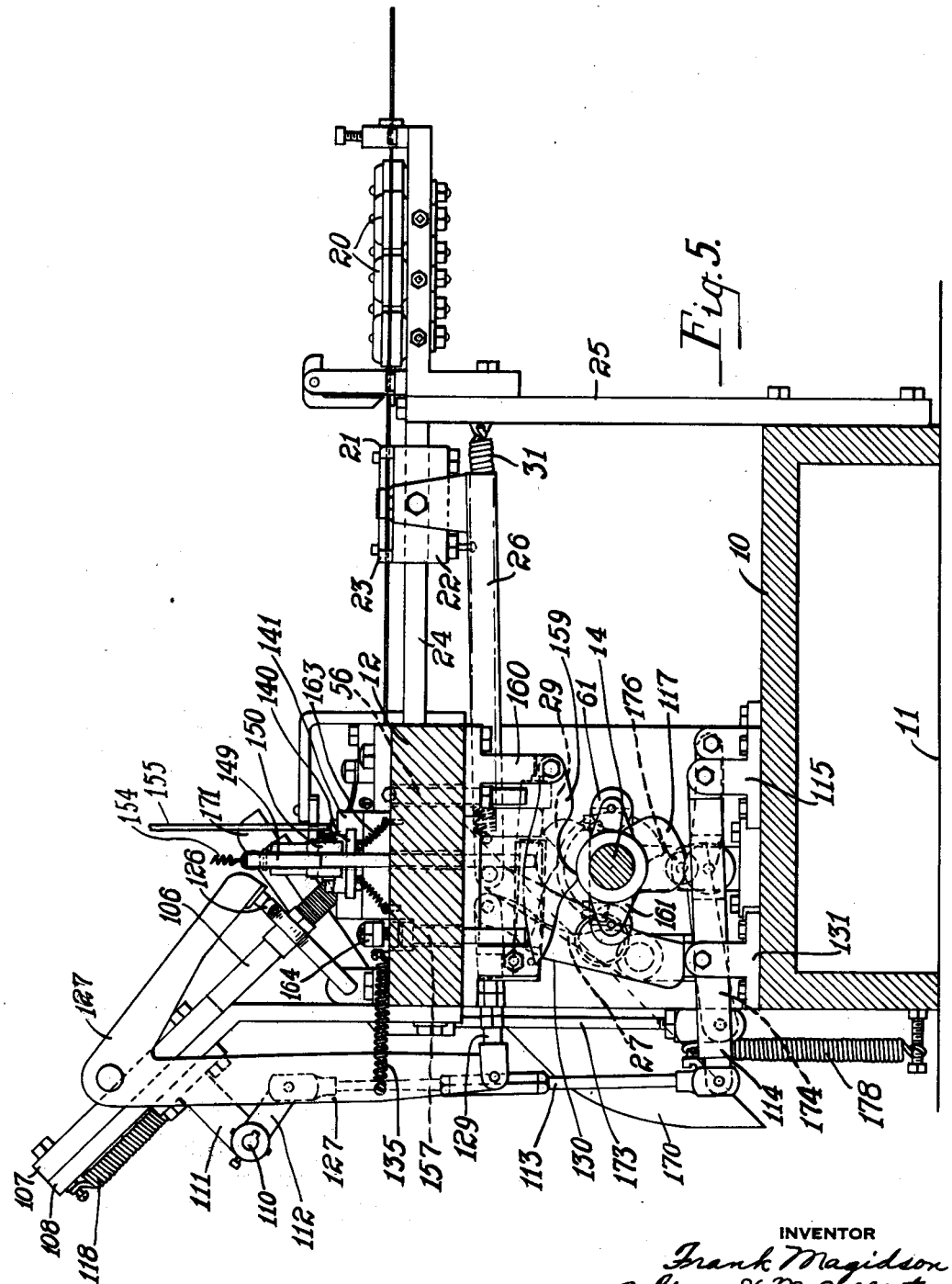
Fig. 5 is a view in vertical section taken on line V—V of Figure 4.
Figure 6:
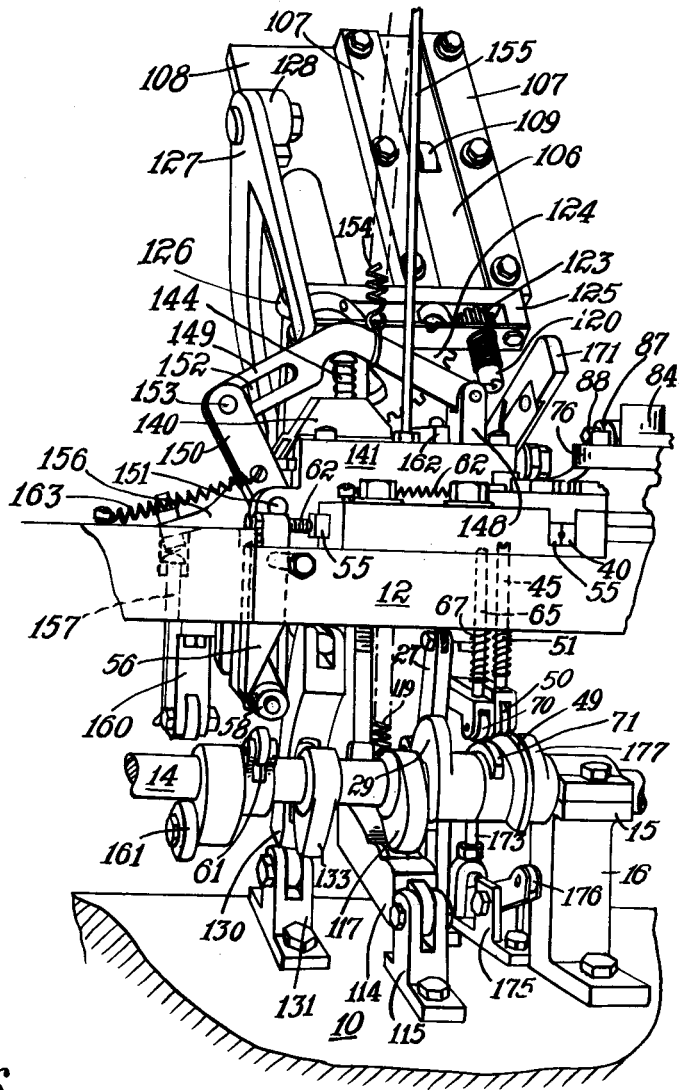
Fig. 6 is a partial view in perspective of the central part of the machine, showing the relation of the various parts thereof.
Figure 14:
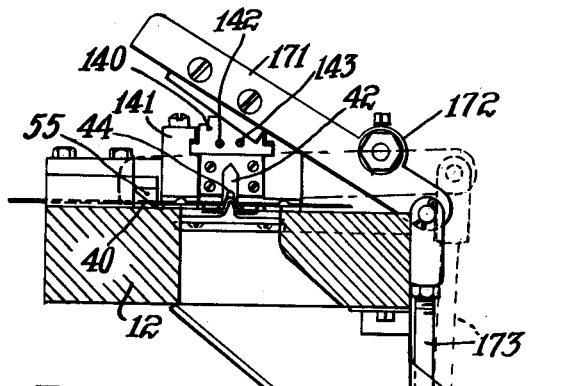
Fig. 14 is an enlarged detail view in elevation of the mechanism for cutting the tag forming material.

Generally, the machine consists of a wire feeding mechanism which pulls the wire from a reel or other source and forces or pushes the same into the machine. After leaving the reel, the wire is drawn through straightening rolls by the wire puller and is directed past a cutter blade onto the end of a slotted plate. The wire, as it passes over the slot in the plate, is inserted through the end of a strip of tag forming material which has been forced upwardly through the slot in the wire guiding plate. The tag forming material is taken from a roll or other suitable source and the end thereof is placed in the machine underneath the slotted plate by the operator when the machine is first started.

After a length of wire suitable for forming the fastener has been forced through the tag forming material in the machine, the wire is severed and the ends are bent upwardly around a mandrel forming it into U-shape. At the time the wire is severed it projects a greater distance on one side of the mandrel than on the other so that one leg of the wire is shorter than the other. As soon as the wire has been bent into U-shape, a plier arm mechanism is operated which clamps the legs of the wire against the mandrel securely holding it in position to be acted on by wire bending mechanisms that operate in a predetermined sequence.

The plier arm engaging the short leg of the wire is so shaped that it bends the shorter leg over the top of the mandrel so that it extends across the longer leg thereof. After the plier arms have clamped the wire against the mandrel and bent the short leg across the top thereof so that it intersects or crosses the long leg, a plunger is operated and moved at an angle toward the ends of the wire. The plunger is located on the same side of the mandrel as the long leg of the wire and has an opening in the end thereof which receives the end of the short leg when the plunger is moved into engagement with the long leg. The plunger bends the long leg of the wire across the mandrel so that it intersects the short leg and forms an angle of approximately 90° therebetween. A cylinder mounted on the end of the plunger and having a finger engaging the long leg of the wire is then rotated and the long leg of the wire is looped around the short end.

After the loop has been formed, the ends of the wire projecting beyond the loop are then received in the notched ends of shafts which are rotated in opposite directions and bend the ends of the wire into contact with each other, forming the jaws for the clip or fastener.

As soon as the jaws have been formed on the ends of the wire the plier arms which clamp the wire around the mandrel are moved away from the mandrel and pull the fastener therefrom and also pull a length of tag forming material through the machine. When a length of material sufficient to form the desired tag has been pulled through the machine, the plier arms are opened releasing the clip or fastener and at the same time, a cutter is operated which severs the tag forming material to length. The tag having the clip or fastener formed thereon drops into a chute and is carried to a receiving receptacle.

As the tag forming material is severed the mechanism which crimps the tag forming material and forces it upwardly through the slot in the wire guiding plate is again operated and the end of the material is in position to have a length of wire inserted therethrough. The above cycle is then repeated and another tag is formed.

The machine may be provided with mechanism for stamping a marking indicia of any suitable character on the tag forming material at spaced intervals as it is fed into the machine. This mechanism is arranged to operate and stamp the material during the time that the clip is being formed on the end thereof. All of the various mechanisms which operate on the tag forming material and the wire from which the clip is formed are cam actuated and operate in timed relation to each other and in the order named.

Machine in detail

The machine is provided with a horizontal bed plate 10 which is mounted on a suitable table or supporting member 11 (a portion of which only is shown). The wire feeder, the wire cutter, the stationary forming mandrel, the wire holding pliers, the wire looping mechanism, the jaw-shaping mechanism, the tag forming material, and the stamping mechanism are all located above the bed plate 10 on a shelf 12 which is supported by uprights 13 secured to the bed plate (Figs. 1, 2, 3, 4, and 5). Each of these mechanisms operate in the plane of the wire in its passage into position in the machine and they are actuated in timed relation, to each other, through a series of cams secured to a cam shaft 14 which is journaled in bearings 15 formed in standards 16 supported on the bed plate 10.

The cam shaft 14 is driven by a shaft 17 through suitable gearing (not shown). The shaft 17 is in turn driven by a motor 18. The gearing connecting the shaft 17 and the cam shaft 14 is such as to rotate the cam shaft at the most efficient speed for operating the various mechanisms.

Wire feeding mechanism

The wire for supplying the machine is obtained from a coil or other source which is supported on a reel (not shown) having a vertical axis. The wire as it is pulled from the reel passes through a series of straightening rollers 20 (Figs. 1, 3, and 5) arranged in a horizontal plane which straighten the wire as it emerges therefrom. The wire leaving the straightening rolls passes through an opening in a lug 21 on the end of a block 22, across the top of the block and through an opening in a lug 23 on the other end of the block 22.

The block 22 which carries the wire pulling mechanism is slidably mounted on a fixed shaft or bar 24 extending between the shelf 12 and an upright member 25 secured to the bed plate 10. The member 25 also supports the straightening rollers 20.

In order to move the block 22 back and forth on the shaft or bar 24 and pull a length of wire from the reel or other source and force it into the machine when the block is moved toward the shelf 12, the short leg of an L-shaped member 26 (Figs. 5, 7, 8, and 9) is secured to the side of the block 22. The block 22 has a slot (not shown) in the side thereof in which the means securing the lever 26 thereto is received forming a slip connection between the block and the lever, the purpose of which will be hereinafter explained.

The long leg of the member 26 is connected to the end of a lever 27, which is pivoted to a bracket 28 secured to the bed plate 10. The lever 27 is turned about its pivot so as to move the member 26 and the block 22 forwardly on the shaft 24 by a cam 29 which periodically strikes a roller 30 on the lever 27. The cam 29 is secured to the cam shaft 14. A spring member 31 secured to the member 26 and the upright 25 returns the block 22 to its original position as soon as the cam 29 has disengaged the roller 30.

In order to feed a length of wire into the machine when the block is moved forward on the shaft 24, the end of the short leg of the L-shaped member 26 is extended above the top of the block 22 and has a notch 32 formed therein which receives a toe 33 extending from a trigger 34 pivotally mounted on the top of the block 22. The trigger 34 has an eccentric surface opposite the toe 33 and adjacent the wire passing over the block which is brought into contact with the wire when the trigger is turned and forces it against the edge of a member 35 mounted on the block 22. From this arrangement it is seen that when the cam 29 comes in contact with the roller 30 and turns the lever 27, the member 26 is first moved relative to the block 22, through the slip connection between the two members and turns the trigger 34 about its pivot point so that the eccentric surface wedges the wire tightly against the biting edge 35. As soon as the member 26 has moved to the end of the slot it pulls the block and wire held thereon toward the shelf 12 and a length of wire is fed into the machine. When the cam 29 releases the lever 27, the spring member 31 pulls on the member 26 and causes it to move rearwardly relative to the block 22. This rearward movement of the lever 26 in the slot turns the trigger 34 and releases the wire and permits the block 22 to be returned to its original position without disturbing the wire in the machine. The rearward movement of the block 22 is limited by a set screw 36 which is threaded through a projection 37 on the side of the block 22. By adjusting the rearward movement of the block it is apparent that the length of wire being fed into the machine may be readily controlled.

Crimping mechanism

Figure 13:
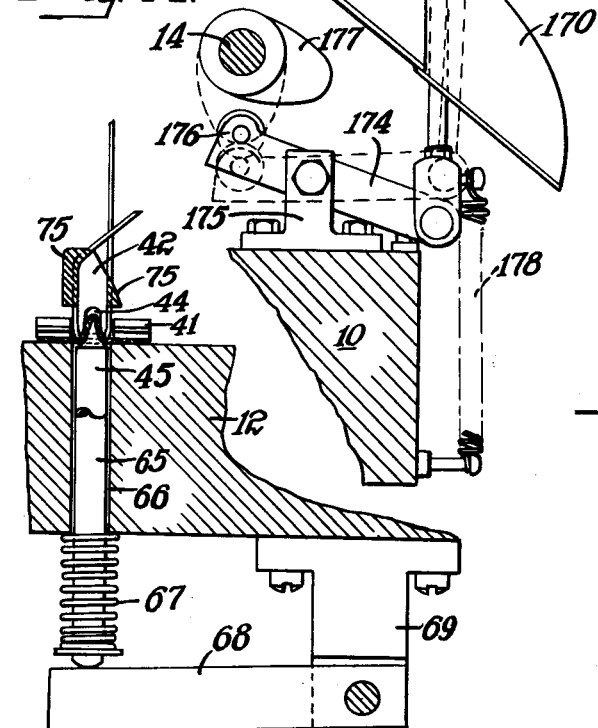
Fig. 13 is an enlarged detail view in elevation showing the mechanism for performing the first bending operation on the wire.
Figure 12:
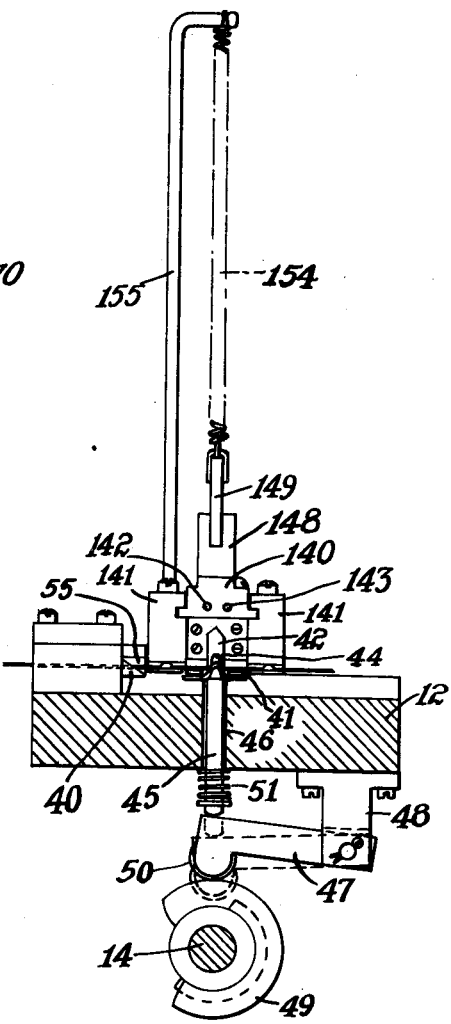
Fig. 12 is an enlarged detail view in elevation showing the mechanism for crimping the end of the tag forming material.
Figure 20:
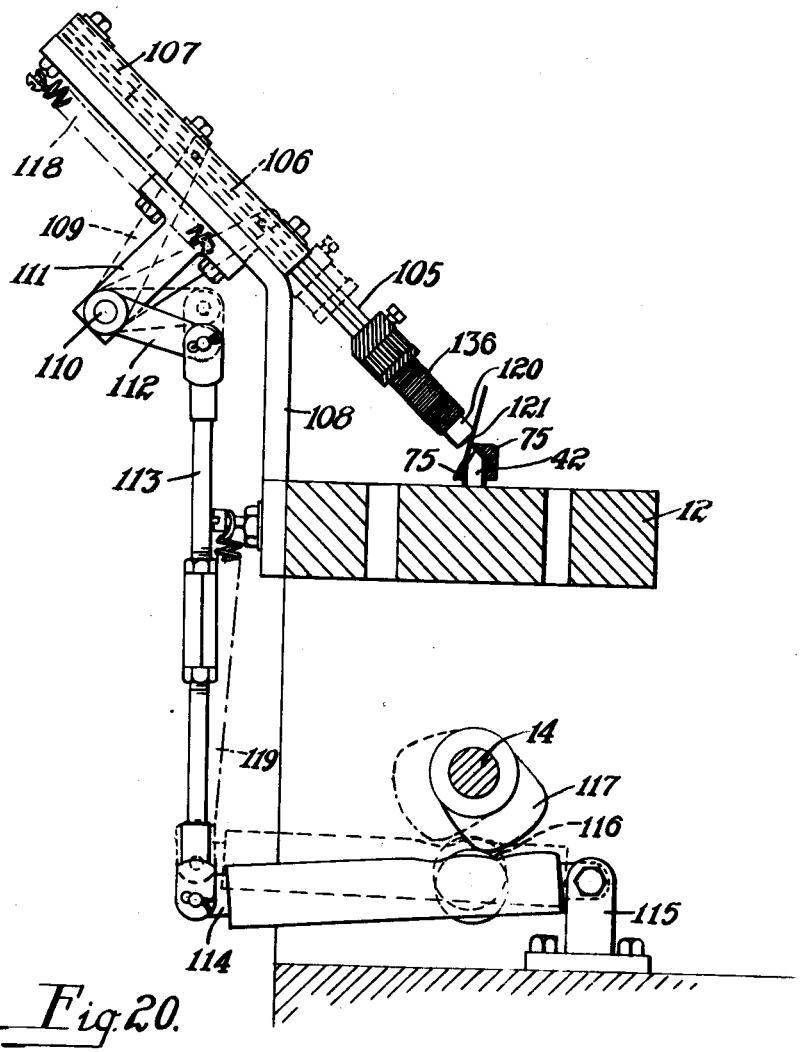
Fig. 20 is an enlarged detail view in elevation of the wire bending plunger and of the mechanism for operating the same, shown in the position when the plunger has been moved into its wire bending position.

The wire, as it is forced into the machine by the feeding mechanism, passes through an opening in a cutter block 40 onto the grooved end of a plate 41 which is pivoted to the shelf 12 (Figs. 12, 13, and 28). The grooved end of the plate 41 guides the wire into the machine and positions it underneath a stationary forming mandrel 42 about which the clip or fastener is formed. The wire, as it passes underneath the mandrel is threaded through the end of tag forming material which was placed underneath the plate 41 by the operator and which has been forced upwardly through a slot 43 in the plate 41 into a longitudinally extending groove 44 in the bottom of the mandrel 42.

The mechanism for forcing the material upwardly through the slot 43 so as to crimp the same comprises a pin 45 which is slidably mounted in an opening 46 in the shelf 12 located beneath the slot 43 in the plate 41. The lower end of the pin 45 rests on the end of a lever 47 which is pivoted to a bracket 48 depending from the shelf 12. The lever 47 is turned about its pivot so as to raise and lower the pin 45 and force the material through the slot 43 by a cam 49 on the cam shaft 14 which engages a roller 50 mounted on the lever 48. A spring member 51 secured to the pin 45 and bearing against the bottom of the shelf 12 maintains the pin in its lowermost position and causes the roller 50 to follow the contour of the cam 49.

In order that the wire may be readily threaded through the crimped tag forming material the upper end of the pin 45 is bifurcated (Fig. 28) forming an eye through which the wire passes as it is forced into the machine. The cam 49 is designed so as to raise the pin 45 and crimp the tag forming material at the same time that the wire feeding mechanism starts to move forward and force a length of wire into the machine.

Wire cutting mechanism

After a length of wire sufficient for forming the fastener or clip has been fed into the machine and inserted through the crimped end of the tag forming material, a cutter bar 55 is moved across the face of the cutter block 40 and severs the wire to length (Figs. 10 and 11). The cutter bar 55 is slidably mounted on the cutter block and is moved forward to sever the wire by a lever 56 which is pivoted to the shelf 12 and has its upper end in engagement with the rear face of the cutter bar.

The lower end of the lever 56 has a sloping surface 57 along which a roller 58 mounted on a lever 59 pivoted to a bracket 60 depending from the shelf 12 is adapted to travel and turn the lever 56 about its pivot point. The lever 59 is raised and the roller 58 is forced to move along the sloping surface of the lever 56 by a cam 61 which is secured to the cam shaft 14. When the cam 61 forces lever 59 upwardly, the roller 58 travels along the sloping surface 57, turning the lever 56 about its pivot point so that the end thereof strikes the cutter bar 55 and forces it across the face of the cutter block 40. A spring member 62 secured to the cutter blade 55 and to the cutter block 40 normally maintains the cutter bar in its inoperative position.

In order to vary the length of the stroke of the cutter bar and to insure that the wire will be cut at the proper time relative to the other mechanisms acting on the wire, the lever 56 has a set screw 63 extending through the upper end thereof which engages the rear face of the cutter bar 55 and permits adjustment of the cutter bar. The wire extends through the face of the cutter block at an angle so that when the wire is severed, points will be formed on the ends thereof.

Wire bending mechanism

At the time the wire is severed, one end thereof projects beyond the mandrel 42 a greater distance on one side than on the other side. As soon as the wire has been severed, the grooved end of the plate 41 is raised so that the mandrel 42 is received in the slot 43 and the wire carried by the plate is bent around the mandrel into substantially U-shape. The slot 43 is of slightly greater width than the width of the mandrel so that the ends of the wire will extend upwardly along the sides of the mandrel when the plate is raised.

The mechanism for moving the plate 41 upwardly around the mandrel 42 comprises a pin 65 which is slidably mounted in an opening 66 in the shelf 12 (Fig. 13). The upper end of the pin 65 is positioned underneath the plate 41 and is normally held out of engagement therewith by a spring member 67 which is fastened to the lower end of the pin and bears against the bottom of the shelf. The lower end of the pin 65 rests on a lever 68 which is pivoted to a bracket 69 depending from the shelf 12. The lever 68 has a roller 70 on the end thereof which follows a cam 71 secured to the cam shaft 14.

As the cam shaft 14 rotates, the cam 71 will engage the roller 70, raise the end of the lever 68 and force the pin 65 upwardly against the tension of the spring 67 into engagement with the plate 41 which in turn is raised and bends the ends of the wire around the mandrel.

Wire holding and bending mechanism

After the ends of the wire have been bent upwardly around the mandrel, mechanism is actuated which clamps the ends of the wire against the mandrel and bends the shorter end of the wire across the top of the mandrel so that it intersects or crosses the long leg. This mechanism comprises a pair of plier arms 75 pivotally mounted on a block 76 which is slidably mounted in a guideway 77 secured to the shelf 12 (Figs. 15, 16, 17, 18, and 19).

When the ends of the wire have been bent around the mandrel, spring members 78 and 79 secured to the guideways 77 and to a cross bar 80 on the block 76, move the block forward in the guideways 77 and position the plier jaws 75 on each side of the mandrel 42. The plier jaws, which are maintained in their open or spaced position when the block 76 is moved forward by a spring 81 disposed between the jaw, are then closed and clamp the wire against the sides of the mandrel.

To close the plier jaws 75 a spreader 82 is pivotally mounted on the block 76 between the arms of the pliers on the opposite side of the pivotal connection from the wire engaging jaws. A spring member 83 fastened to the block 76 and to an arm 84 secured to the top of the spreader 82 tends to turn the spreader and maintain the plier jaws 75 in their closed position. The spring member 83 is of sufficient size to readily close the jaws against the compression of the spring 81.

When the block 76 is being moved forwardly to position the plier jaws on each side of the mandrel 42, the jaws 75 are held in their open position by a spring pressed latch 85 which engages a lug 86 formed on the arm 84, holding the arm and spreader 82 in position to permit the spring 81 to force the jaws apart. As the block reaches the forward limit of its travel the latch 85 strikes a stop 87 on the side of the guideway 77 and permits the spring 83 to turn the arm 84 and spreader 82 which closes the jaws and forces them to clamp the wire against the mandrel. A set screw 88 extending through the stop 87 provides an adjustment for regulating the closing of the plier jaws 75.

The plier jaws are so shaped that when closed so as to clamp the ends of the wire around the mandrel the short leg of the wire will be bent across the top of the mandrel so that it intersects the long leg of the wire (Fig. 13).

These plier jaws hold the wire against the mandrel until the clip or fastener is completely formed at which time the block 76 is moved rearwardly in the guideway 77 and the plier arms pull the fastener from the mandrel 42. The mechanism for moving the block rearwardly against the tension of the springs 78 and 79 comprises a lever 89 which is pivoted in a bracket 90 secured to the bed plate 10 and extends upwardly through an opening 91 in the block 76. The upper end of the lever 89 is secured to a turnbuckle 92 which is connected to a lug 93 projecting upwardly from the block 76. The lower end of the lever 89 has a foot 94 extending outwardly therefrom which supports a lever 95 pivoted to a bracket 96 secured to the bed plate 10. The lever 95 has a roller 97 on the end thereof which follows a cam 98 secured to the shaft 14. The rearward travel of the block 76 may be controlled by lengthening or shortening the turnbuckle 92.

From this arrangement it is apparent that as the cam shaft 14 rotates, the cam 98 will depress the lever 95 which forces the foot 94 downwardly, turning the lever 89 which moves the block 76 rearwardly and causes the plier jaws 75 to pull the fastener from the mandrel 42. To open the plier jaws 75, so as to release the clip and put the pliers in position for clamping another wire around the mandrel, a roller stop 99 is provided which is adapted to engage the arm 84 on the spreader 82 as the plier jaws 75 are moved from the mandrel. The stop 99 is mounted on a bracket 100 secured to the shelf 12. On each rearward movement of the block 76 the arm 84 strikes the roller stop 99 and turns the spreader 82 out of engagement with the pliers and permits the spring 81 to open the jaws 75. The stop 99 is arranged to turn the arm 84 sufficiently to allow the latch 85 to engage the lug 86 and hold the jaws 75 in their open position. As soon as the cam 98 has disengaged the roller 97 the spring members 78 and 79 again move the block 76 forwardly in the guideway and another length of wire is clamped around the mandrel 42.

The bracket 100 supporting the roller stop 99 may be moved forwardly and rearwardly on the shelf so as to regulate the time the plier jaws 75 will be opened and release the fastener.

*Wire bending and looping mechanism*

After the short leg of the wire has been bent across the top of the mandrel by the plier jaws 75, the long leg of the wire is bent across the top of the mandrel and is looped about the short leg of the wire.

The mechanism for bending the long leg of the wire and looping the same about the short leg comprises a plunger 105 mounted on the end of a block 106 which is slidably mounted in guideways 107 (Figs. 1, 4, 5, 6, 20, 21, and 24). The guideways 107 are supported on a bracket 108 which is attached to the shelf 12. The plunger 105 is moved into engagement with the wire through a lever 109, one end of which is pivoted to the block 106 while the other end is secured to a shaft 110 journaled in a bracket 111 which depends from the bracket 108. The shaft 110 has an arm 112 secured thereto on the opposite side of the bracket 111 from the lever 109. The arm 112 is connected to the top of a rod 113, extending upwardly from the end of a lever 114 which is pivoted to a bracket 115 secured to the bed plate 10. The lever 114 supports a roller 116 which is a follower for a cam 117 carried by the cam shaft 14. Spring members 118 and 119 attached to the bracket 108 and the lever 109, and the lever 114 and the shelf 12, respectively, hold the plunger 105 in its inoperative position.

When the jaw plier arms 75 have clamped the wire around the mandrel 42, the cam 117 depresses the lever 114 which pulls the rod 113 downwardly, turning the shaft 110 and the lever 109 and moves the block 106 downwardly, against the tension of the springs 118 and 119, whereby the plunger 105 is moved against the long leg of the wire. The guideway 107 carrying the block 106 and the plunger 105 is at an angle of 45° to the shelf 12 so that as the plunger is moved downwardly it will strike the long leg of the wire and receive the bent end of the short leg of the wire in a longitudinally extending opening O formed in the plunger. The plunger is moved downwardly a distance sufficient to bend the long leg of the wire across the top of the mandrel so that it intersects the short leg at an angle of approximately 90°.

When the plunger has reached the lower l'mit of its travel the long leg of the wire has been bent across the short leg thereof at an angle of substantially 90° thereto and the short leg is received in an opening O in the plunger 105. While the plunger is held in this position, a cylinder the plunger 105, is turned through substantially one revolution to loop the long leg of the wire about the short leg. In order to form this loop the sleeve 120 is provided with a finger or hook 121 that engages the long leg of the wire and the plunger is provided with a pin 122 disposed at an angle of substantially 180° to the finger 121 when it is in a starting position. As a result of this construction, when the sleeve or cylinder 120 is rotated the finger 121 bends the long leg of the wire around the short leg, forming one end of the loop, and then around the pin 122 to form the other end of the loop. At the completion of the movement of the sleeve 120 the end of the long leg extends in substantially the same direction as it did before the guide loop was formed (Figs. 27 and 28). In order to rotate the cylinder 120 to form the loop in the long leg of the wire, a pinion 123 is secured to the top of the cylinder that meshes with a segmental rack bar 124 which is pivoted in a frame 125 secured to the end of the block 106. When the loop is to be formed, a projection 126 on the rack bar is struck by one leg of a bell crank lever 127 which is pivoted to a lug 128 formed on the bracket 108. The bell crank lever 127 is turned about its pivot, so as to actuate the rack bar 124, by a rod 129 which connects one leg of the bell crank with a lever 130 that is pivoted to a bracket 131 secured to the bed plate 10 and actuated by a cam 133 secured to shaft 14. The lever 130 carries a roller 132 which follows cam 133. The rod 129 connecting the bell crank lever 127 with the lever 130 may be lengthened or shortened through a turnbuckle 134 so that the rack bar 124 will be given sufficient travel to turn sleeve 120 the amount required to form the loop. The bell crank lever 127 is maintained in its inoperative position by its spring member 135 which is connected to one leg of the lever 127 and to the shelf 12.

From this construction, it is readily seen that the cam 133 actuates the lever 130 and turns the bell crank 127 forcing one leg into engagement with the projection 126 on the rack bar 124, and turning the cylinder 120 through the pinion 123. The rack bar 123 is returned to its initial position after the loop has been formed by a spring member 136 mounted on the cylinder 120 and secured to the frame 125.

*Jaw shaping mechanism*

As soon as the long leg of the wire has been looped around the short leg, the block 106 carrying the plunger 105 is returned to its raised or initial position through the spring members 118 and 119, leaving the ends of the wire above the loop projecting in opposite directions at approximately 90° to each other. These ends of the wire are then bent toward each other until the points are in contact so as to form jaws of the fastener which may be readily spread apart by pressing the sides of the body of the fastener below the loop toward each other.

The mechanism for bending the ends of the wires into contact with each other comprises a block 140 which is slidably mounted between guiding members 141 secured to the shalf 12 (Figs. 22, 23, 24, 25, and 26). The block 140 has shafts 142 and 143 rotatably mounted therein, the ends of which project beyond the face of the block. These projecting ends of the shafts 142 and 143 have slots or notches formed therein in which the ends of the wire are received when After the ends of the wire have been received in the notched ends of the shafts 142 and 143 a rack bar 144 extending upwardly from the block 140 is depressed turning the shafts in opposite directions so as to bend the ends of the wire into contact with each other. The rack bar 144 meshes with a gear 145 on the shaft 142 which in turn meshes with a gear 146 on the shaft 143. A spring member 147 secured to the rack bar 144 and bearing against the block 140 maintains the rack bar in its raised or upper position so that the shafts 142 and 143 will be rotated when the bar is depressed.

In order to move the block 140 forwardly so that the ends of the wire will be received in the notched ends of the shafts 142 and 143 and depress the rack bar 144 as soon as the ends of the wire are positioned therein, the forward end of the block 140 has a post 148 projecting upwardly therefrom to which one end of a lever 149 is pivoted. The lever 149 extends rearwardly over the block across the top of the rack bar 144 and is connected to a bifurcated arm 150 secured to a shaft 151 which is journaled in the rear ends of the guiding members 141. The rear end of the lever 149 is slotted as at 152 for receiving pin 153 which connects the lever to the arm 150 thereby, forming a slip connection between the lever 149 and the arm 150, the purpose of which will be hereinafter explained.

The pin 153 is normally maintained at the rear end of the slot 152 by a spring member 154 attached to the lever 149 and to a member 155 extending upwardly from the shelf 12.

To turn the shaft 151 and move the block 140 forward in the guideways 141, an arm 156 secured to the shaft 151 has the end thereof resting on a vertically extending pin 157 which is slidably mounted in an opening 158 in the shelf 12. The lower end of the pin 157 rests on the end of a lever 159 pivoted to a bracket 160 which depends from the shelf 12. A roller cam 161 secured to the cam shaft 14 raises the lever 159 and the pin 157 and turns the shaft 151.

When the cam 161 has raised the lever 159 and turned the shaft 151, the end of the arm 150 connected to the lever 149 is moved forward and since the spring member 154 prevents the pin 153 connecting the arm with the lever, from moving in the slot 152, the lever 149 is pushed forward and moves the block 140 in the guideway between the members 141.

When the ends of the wire have been received in the slotted ends of the shafts 142 and 143, the block 140 strikes a stop 162 extending across the guiding member 141 and limiting further movement of the block. After the block 140 engages the stop 162, cam 161 continues to raise pin 157 to turn shaft 151. Since the block is now held against movement, this further turning of the arm 150 causes pin 153 to move along the slot 152 and depress lever 149 against the tension of the spring 154, into engagement with the top of the rack bar 144 whereby the rack bar is depressed and the shafts 142 and 143 are rotated in opposite directions and bend the ends of the wire toward each other to form the jaws of the fastener or clip.

As soon as the jaws have been formed, the cam 161 disengages the lever 159 and permits the pin 157 to drop away from the arm 156. The block 140 is then returned to its initial position by spring members 163 fastened thereto and to the shelf 12.

When the jaws have been formed and the block 140 returned to its initial position the mechanism operating the plier jaws 75 which are holding the wire around the mandrel 42, is actuated and the completed fastener is pulled from the mandrel and a length of tag forming material is fed into the machine.

*Tag forming material feeding mechanism*

As soon as the jaws have been formed on the ends of the wire the cam 98 depresses the lever 95 and turns the same about its pivot point moving the block 76 carrying the jaw plier arms 75 away from the mandrel 42. As the block moves rearwardly the fastener formed on the end of the roll of tag forming material is pulled from the mandrel, pulling with it a length of tag forming material which passes underneath the plate 41. When the desired length of tag forming material has been pulled through the machine, the arm 84 on the jaw spreading member 82 strikes the roller stop 99 and the jaw plier arms 75 are opened and permit the fastener to drop out.

*Tag serving mechanism*

At the same time the plier jaws 75 are opened so as to release the clip or fastener, the tag forming material is severed and the completed tag drops into a chute 170 which conducts the tag to a receiving receptacle (not shown).

The tag forming material cutting mechanism comprises a knife 171 which is pivoted to a bracket 172 extending upwardly from the shelf 12 (Figs. 1, 2, 4, 6, and 14). The rear end of the knife 171 is connected to a rod 173 which in turn, is connected to a lever 174 pivoted to a bracket 175 extending upwardly from the bed plate 10. The lever 174 carries a roller 176 which follows a cam 177 on the cam shaft 14. A spring member 178 forces the roller to follow the contour of the cam 177.

When the plier jaws 75 have pulled a length of tag forming material through the machine sufficient to form the desired tag the cam 177, turns the lever 174 about its pivot point which raises the rod 173 and swings the knife blade 171 downwardly through a slot in the shelf 12 and severs the tag forming material. The knife cutter blade and the edge of the shelf alongside of which the knife passes form the shears for severing the tag forming material to length.

*Stamping mechanism*

If it is desired, the tag forming material may be stamped at regular intervals with some suitable marking indicia, such as a date, so as to form a characteristic mark on each tag.

The stamping mechanism comprises a stamping die 180 secured on the end of a lever 181 which is pivoted to a member 182 extending upwardly from the shelf 12 (Figs. 30, 31, 32, 33, and 34). The other end of the die-carrying lever 181 is connected to a rod 183 which in turn is connected to a lever 184 pivoted to a bracket 185 depending from the shelf 12. The lever 184 carries a roller 186 intermediate of its length which follows a cam 187 on the cam shaft 14. A spring member 188 secured between the die-carrying lever 181 and the upright 182 normally holds the die 180 above the tag forming material.

When the cam 187 engages the roller 186, the lever 184 is turned about its pivot and the die 180 carried by the lever 181 is forced against the tag forming material stamping a suitable marking indicia thereon. As soon as the cam 187 disengages the roller 186 the spring 188 returns the die-carrying lever 181 to its original position.

To ink the die 180, an ink-carrying roller 189 is moved across the face of the die each time the lever 181 is turned and the die pressed against the tag forming material. The end of the lever 181 carrying the die 180 rides on the roller 189 which is mounted between the prongs of a bifurcated lever 190. The lever 190 is pivoted to the upright 182 and has a spring member 191 attached thereto and to the upright 182 which normally positions the roller 189 adjacent the outer end of the lever 181 and holds it against an ink conveyor roller 193 mounted in an ink container 194 secured to the shelf 12. The ink conveyor roller 193 is so positioned that the roller 189 is prevented from passing beyond the end of the lever 181.

In order to turn the ink conveyor roller 193 so as to convey ink from the container 194 to the roller 189, a pinion 195 is mounted on a shaft 196 which supports the roller 193. The pinion meshes with a gear 197 which is mounted on the side of the container 194 and has a series of studs 198 projecting outwardly from the side thereof which are utilized for turning the gear. These studs 198 are adapted to be received, one at a time in a notch 199 formed in the end of a vertically extending rod 200 which is connected at the bottom to a lever 201 pivoted in a bracket 202 depending from the shelf 12. The lever 201 has a roller 203 mounted thereon which follows a cam 204 on the cam shaft 14. A spring member 205 attached to the rod 200 and the lever 201 holds the rod against an outwardly projecting pin 206 on the side of the ink container 194. The pin 206 is so placed that the notch 199 on the end of the rod 200 is positioned underneath one of the studs 198 on the gear 197.

From this construction it is apparent that as the cam shaft 14 rotates, the cam 204 raises the lever 201 and the rod 200 causing one of the studs 198 to be received in the notch 199 and turn the gear 197 which in turn rotates the pinion 195 and the ink roller 193, inking the roller 189. The cam 204 is so designed that ink will be conveyed to the roller 189 while the plier jaws 75 are moving away from the mandrel and pulling the tag forming material through the machine.

After the ink has been conveyed to the roller 189, the cam 187 raises the lever 184 and forces the die 180 carried by the lever 181 against the tag forming material. As the lever 181 is turned the roller 189 passes across the face of the die 180. The cam 187 is designed to operate and force the die 180 against the cloth so as to stamp the marking indicia thereon during the time that the wire clip is being bent around the mandrel.

*Operation of the machine*

When the machine is to be operated the operator places a roll of tag forming material on a spindle at the end of the machine and positions the end of the material underneath the plate 41 and the mandrel 42. When the tag forming material has been so placed, the motor 18 is started which rotates the cam shaft 14. As the cam shaft rotates, the cam 49 engages the lever 48 and raises the pin 45 which forces a portion of the tag forming material through the slot 43 into the groove 44 in the mandrel 42. As soon as the tag forming material has been crimped, the cam 29 engages the lever 27 and the block 22 is moved toward the mandrel, and a length of wire is fed into the machine and inserted through the crimped end of the tag forming material. As the clip has been fed into the machine, the cam 61 turns the lever 56 and forces the cutter blade 55 across the face of the cutter block 40 severing the wire. The cam 71 then engages the lever 68 and raises the pin 65 which forces the plate 41 upwardly and bends the wire into U-shape around the mandrel 42. As soon as the wire has been bent into U-shape the spring members 78 and 79 move the block 76 toward the mandrel. When the plier jaws 75 carried on the block 76 have been positioned on each side of the mandrel the latch member 85 hits the stop 87 and permits the spring 83 to turn the spreader 82 and close the jaws. The jaws 75 clamp the wire around the mandrel and bend the short leg thereof over the top of the mandrel so that it intersects the long leg.

While the wire is held around the mandrel by the plier jaws 75 the plunger 105 is moved downwardly through the described mechanism into engagement with the long leg of the wire and bends it across the mandrel so that it intersects the short leg at an angle of approximately 90°. The short end of the wire is received in the opening in the end of the plunger when the plunger is moved downwardly and the long leg is engaged by the finger 121 on the cylinder 120 carried on the plunger 105. As soon as the plunger has reached the lower end of its travel, the cam 133 operates the bell crank 127 and rotates the cylinder 120 causing the long leg of the wire to be looped around the short leg. The plunger mechanism is then returned to its inoperative position and the block 140 carrying the shafts 142 and 143 is moved forwardly by the cam 161. As soon as the ends of the wire are received in the notched ends of the shafts 142 and 143 the block 140 strikes the stop 162 and the lever 149 is forced downwardly so that it depresses the rack bar 144 which in turn rotates the shafts in opposite directions and bends the ends of the wire into contact with each other to form the fastener jaws and complete the clip.

After the jaws are formed on the wire the block 140 is moved rearwardly so that the shafts 142 and 143 are out of engagement with the ends of the wire, the cam 98 engages the lever 95 and forces the lever 89 to move the block 76 carrying the plier jaws 75 away from the mandrel. This movement of the block 76 causes the plier arms to pull the fastener or clip from the mandrel and at the same time pull a length of the tag forming material through the machine. When a sufficient length of material has been pulled through the machine to form the desired tag, the trigger 84 hits the roller stop 99 which opens the arms 75 and releases the fastener.

At the same time that the plier jaws are opened the cam 177 strikes the lever 174 turning the cutter blade 171 and shearing the tag forming material. The completed tag, after the shearing operation, drops into a chute which conveys the tag to a tag receiving receptacle.

During the time the tag forming material is being pulled through the machine, the roller 194 is rotated and ink is conveyed from the container 193 to the ink roller 189. After the roller 189 has been inked and while the fastener is being formed, the cam 187 raises the lever 181 and forces the stamping die 180 carried thereby against the tag forming material and marking indicia is stamped on the material. Each time the die-carrying lever 181 is forced downwardly As soon as the tag forming material has been severed and the completed tag and clip have dropped into the chute, the cut end of the tag forming material is forced into the groove in the mandrel and a second cycle of operation is started.

It is to be understood that while I have described one embodiment of my invention, certain changes, modifications, substitutions and the like may be made therein without departing from the spirit of this invention nor the scope of the appended claims.

What I claim as new and desire to secure by Letters Patent is:

1. A machine for forming tags having a fastener or clip thereon comprising mechanism for crimping the end of a length of web withdrawn from a roll of material, mechanism for threading a length of wire through the crimped portion of said material, mechanism for bending and twisting the wire to form a fastener, said bending and twisting mechanism being adapted to pull a length of web from the roll of material when the clip is completed, mechanism for cutting said material to the desired length and mechanism for forming marking indicia on the material as it is fed into the machine.

2. A machine for forming tags having a clip or fastener thereon comprising a mandrel having a groove in the bottom thereof, under which the end of a length of web withdrawn from a roll of tag forming material is positioned, mechanism for forcing a portion of said material into said groove, mechanism for threading a length of wire through said material beneath said mandrel, mechanism for bending the ends of said wire upwardly around said mandrel, mechanism for bending one of said wires across the other end and for holding said wire in position on said mandrel, mechanism for looping and twisting the ends of said wire so as to form a clip, means for withdrawing said wire holding mechanism so as to withdraw said fastener from said mandrel and pull another length of web under said mandrel, means for shearing said material to length, and mechanism for stamping said material with marking indicia.

3. A machine for forming tags having a clip or fastener thereon comprising a forming mandrel under which the end of a length of web withdrawn from a roll of material is positioned, means for crimping the end of said material, means for threading a length of wire through the crimped end of said material, means for severing said wire, means for bending the wire around said mandrel and twisting the ends thereof to form a fastener, means for moving said wire bending means away from the mandrel to remove the fastener therefrom and to pull a length of web underneath said mandrel, and means for cutting said material adjacent said mandrel to form the completed tag.

4. A machine for forming tags having a wire fastener thereon, comprising a grooved mandrel having the end of a length of web withdrawn from a roll of tag forming material positioned thereunder, means for forcing a portion of said web into said groove forming a crimp therein, means for threading a length of wire through the web below said mandrel, means for bending and looping said wire around said mandrel to form an article engaging wire bending mechanism, means for withdrawing said clip from said mandrel to remove the clip and pull a length of web into said machine, and means for cutting said material to the length of the desired tag.

5. A machine for forming tags having a wire fastener comprising mechanism for feeding wire from a reel into said machine and inserting it through the end of tag forming material, mechanism for cutting said wire to length, mechanism for bending and looping said length of wire to form a clip, mechanism for holding said wire during the bending and twisting operations and for discharging the completed clip from the machine, said last mentioned mechanism being adapted to pull a length of material through said machine each time a clip is discharged therefrom, and, means for cutting said material to the desired length of tag.

6. A machine for forming tags having a wire fastener or clip on the end thereof, comprising mechanism for inserting the wire through the end of a length of tag forming material, mechanism for severing said wire, means for holding said wire in said machine, mechanism for bending said wire to form a clip, and means for actuating said wire holding means when the clip has been completed to discharge it from the machine and to pull another length of said material into said machine.

7. A machine for making tags having a wire clip or fastener on the end thereof comprising a mandrel having the end of a length of tag forming material positioned thereunder, mechanism for feeding a length of wire into said machine and inserting it through the end of said tag forming material, mechanism for severing said wire, mechanism for bending the ends of the wire upwardly around said mandrel, mechanism for holding said wire on said mandrel and bending one end thereof across the other end, mechanisms for bending and looping the straight end of the wire around the first mentioned bent end, mechanism for bending the ends of said wire above the loop toward each other to form jaws for said fastener, means for withdrawing said wire holding mechanism so as to pull said fastener from said mandrel and draw a length of tag forming material through said machine, and mechanism for cutting said tag forming material to the length of tag desired.

8. A machine for making tags having a wire clip or fastener on the end thereof comprising a mandrel under which the end of a length of tag forming material is adapted to be positioned, mechanism for feeding a length of wire into said machine and inserting it through said tag forming material, mechanism for severing said wire, mechanism for bending the ends of the wire upwardly around said mandrel, mechanism for holding said wire on said mandrel and bending one end thereof across the other end, mechanisms for bending and looping the straight end of the wire around the first mentioned bent end, mechanism for bending the ends of said wire above the loop toward each other to form jaws for said fastener, means for withdrawing said wire holding mechanism to discharge said fastened from said machine and feed a length of material into the machine, mechanism for cutting said tag forming material to the length of tag desired, and mechanism for stamping marking indicia on said tag forming material as it is fed into said machine.

9. A machine for making tags having a wire clip or fastener on the end thereof comprising a mandrel under which the end of a length of tag forming material withdrawn from a roll is adapted to be positioned, mechanism for crimping the end of said tag forming material, mechanism for inserting a length of wire through the crimped end of said material, mechanism for severing said wire, mechanism for bending the ends of the wire upwardly around said mandrel, mechanism for holding said wire on said mandrel and bending one end thereof across the other end, mechanisms for bending and looping the straight end of the wire around the first mentioned bent end, mechanism for bending the ends of said wire above the loop toward each other to form jaws for said fastener, mechanism for withdrawing said wire holding mechanism so as to withdraw said fastener from said mandrel and pull a length of tag forming material through said machine, and mechanism for cutting said tag forming material to the length of tag desired.

10. A machine for forming a wire clip or fastener on the end of a length of web material comprising a mandrel under which the end of the web is positioned, mechanism for crimping the end of said web, mechanism for inserting a length of wire through the crimped end, mechanism for severing said wire, mechanism for bending the ends of the wire upwardly around said mandrel, mechanism for holding said wire on said mandrel and bending one end thereof across the other end, mechanisms for bending and looping the straight end of the wire around the first mentioned bent end, mechanism for bending the ends of said wire above the loop toward each other to form jaws for said fastener, mechanism for withdrawing said wire holding mechanism to remove said fastener from said mandrel and pull a length of said web material through said machine, mechanism for cutting said web to the length of tag desired, and mechanism for stamping marking indicia on said tag forming material as it is fed into said machine.

11. A machine for forming a wire fastener on the end of strip material comprising means for crimping the end of said material, means for inserting a length of wire through the crimped end of said material, means for bending the length of wire to form a fastener, means for holding said wire during the bending operation, and means for actuating said wire-holding means to withdraw the completed fastener and pull a length of said strip material through said machine.

12. A machine for forming a wire fastener on the end of strip material comprising means for crimping the end of said material, means for inserting a length of wire through the crimped end of said material, means for bending the length of wire to form a fastener, means for holding the wire during the bending operation, means for withdrawing said wire-holding means to discharge the completed fastener and pull a length of strip material through the machine, and means for forming marking indicia at spaced intervals on the strip material as it is pulled through said machine.

13. An automatic machine for forming a wire fastener on the end of strip material comprising means for crimping the end of said material, means for inserting a length of wire through the crimped end of said material, means for bending the wire into U-shape having one leg longer than the other, means for engaging and holding said U-shaped wire in said machine, means for bending and looping the ends of said U-shaped wire into a clip having article engaging jaws, and means for withdrawing said wire-holding means to discharge said clip and pull a length of strip material into said machine.

14. An automatic machine for forming a wire fastener on the end of strip material comprising means for crimping the end of said material, means for inserting a length of wire through the crimped end of said material, means for bending the wire into U-shape having one leg longer than the other, means for engaging and holding said U-shaped wire in said machine, means for bending and looping the ends of said U-shaped wire into a clip having article engaging jaws, means for withdrawing said wire-holding means to discharge said clip and pull a length of strip material into said machine, and means for forming marking indicia at spaced intervals on said strip material as it is pulled into said machine.

15. A machine for forming fasteners or clips on tag forming material, comprising mechanism for crimping a portion of a strip of tag forming material, mechanism for drawing wire from a source and inserting it through the crimped portion of said material, mechanism for cutting said wire to the desired length, mechanism for bending and twisting said wire to form a clip or fastener, mechanism for holding the wire during the bending and twisting operations, means for withdrawing the wire holding mechanism to discharge the completed fastener and pull a length of the tag forming material through the machine, and mechanism for severing said material to the desired length of tag.

16. An automatic machine of the character described comprising a mandrel, wire feeding mechanism, wire cutting mechanism, means for bending the ends of the cut wire around the mandrel, plier mechanism for holding the wire on the mandrel and bending one end thereof across the other, a plunger movable into contact with the straight end of the wire and having an opening therein for receiving the bent end thereof, a pin projecting from the end of said plunger, a rotatable wire engaging sleeve on said plunger, means for turning said sleeve to twist the end of the wire around the pin and loop it around the bent end thereof, a pair of shafts having slotted ends, means for moving said shafts into engagement with the ends of the wire above the loop, means for turning said shafts in opposite directions to bend the ends of the wire toward each other, means for withdrawing said plier mechanism to pull the wire fastener from the mandrel, and means for separating said plier mechanism to discharge the fastener from the machine.

17. An automatic machine for forming a wire fastener on strip material, comprising a forming mandrel, means for crimping the material, wire feeding mechanism adapted to insert the end of a wire through the crimped portion of the material, wire severing mechanism, means for bending the ends of the wire around the mandrel, plier mechanism for holding the wire on the mandrel and bend one end thereof across the other, a plunger movable into contact with the straight end of the wire and having a longitudinally extending opening therein for receiving the bent end thereof, a pin projecting from the end of said plunger, a sleeve rotatably mounted on said plunger, a wire engaging finger on said sleeve, means for turning said sleeve to twist the wire around the pin and loop it around the bent end thereof, a pair of slotted shafts movable into contact with the ends of the wire above the loop, means for rotating said shafts in opposite directions to bend the ends of the wire into contact with each other, means for withdrawing said plier mechanism to pull the wire fastener from the mandrel and another length of material into the machine, means for spreading the plier mechanism to discharge the fastener, and cutting mechanism for severing the material to length.

18. In a machine of the character described, a wire looping mechanism comprising a slidable plunger having a longitudinally extending opening therein, a pin projecting from the end of said plunger, a sleeve rotatably mounted on the plunger, a finger projecting from said sleeve, and means for turning said sleeve about said plunger.

19. In a machine of the character described, a wire looping mechanism comprising a slidable plunger having a longitudinally extending opening therein, a pin projecting from the end of said plunger, a rotatable member on the end of said plunger, wire engaging means on said rotatable member, and means for turning said member relative to said plunger.

FRANK MAGIDSON.

tact with each other, means for withdrawing said plier mechanism to pull the wire fastener from the mandrel and another length of material into the machine, means for spreading the plier mechanism to discharge the fastener, and cutting mechanism for severing the material to length.

18. In a machine of the character described, a wire looping mechanism comprising a slidable plunger having a longitudinally extending opening therein, a pin projecting from the end of said plunger, a sleeve rotatably mounted on the plunger, a finger projecting from said sleeve, and means for turning said sleeve about said plunger.

19. In a machine of the character described, a wire looping mechanism comprising a slidable plunger having a longitudinally extending opening therein, a pin projecting from the end of said plunger, a rotatable member on the end of said plunger, wire engaging means on said rotatable member, and means for turning said member relative to said plunger.

FRANK MAGIDSON.

CERTIFICATE OF CORRECTION.

Patent No. 1,967,059.                                July 17, 1934.

FRANK MAGIDSON.

It is hereby certified that error appears in the printed specification of the above numbered patent requiring correction as follows: Page 4, line 89, for "jaw" read jaws; page 5, line 142, for "shalf" read shelf; page 6, line 98, for "serving" read severing; page 7, line 92, for "in ersects" read intersects; page 8, line 73, claim 4, for "wire bending mechanism" read clip; and line 74, for "clip" read wire bending mechanism; and that the said Letters Patent should be read with these corrections therein that the same may conform to the record of the case in the Patent Office.

Signed and sealed this 11th day of September, A. D. 1934.

(Seal)

Leslie Frazer
Acting Commissioner of Patents.